United States Patent
Chatroux et al.

(10) Patent No.: US 10,367,187 B2
(45) Date of Patent: Jul. 30, 2019

(54) STORAGE BATTERY INCLUDING A DISCONNECTOR HAVING A FUSE AND AN EXPLOSIVE WITH A HEAT BRIDGE PROVIDING CONTINUITY OF SERVICE IN THE EVENT OF A MALFUNCTION

(71) Applicant: COMMISSARIAT A L'ENERGIE ATOMIQUE ET AUX ENERGIES ALTERNATIVES, Paris (FR)

(72) Inventors: Daniel Chatroux, Teche (FR); Sebastien Carcouet, Vif (FR); Jeremy Dupont, Bourgoin-jallieu (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 391 days.

(21) Appl. No.: 15/032,441

(22) PCT Filed: Nov. 6, 2014

(86) PCT No.: PCT/FR2014/052824
§ 371 (c)(1),
(2) Date: Apr. 27, 2016

(87) PCT Pub. No.: WO2015/067896
PCT Pub. Date: May 14, 2015

(65) Prior Publication Data
US 2016/0254521 A1    Sep. 1, 2016

(30) Foreign Application Priority Data
Nov. 6, 2013    (FR) ...................... 13 60881

(51) Int. Cl.
*H01M 2/34*     (2006.01)
*H01M 4/58*     (2010.01)
*H01H 85/02*    (2006.01)
*H01M 10/0525*  (2010.01)

(52) U.S. Cl.
CPC .......... *H01M 2/348* (2013.01); *H01M 2/345* (2013.01); *H01M 4/5825* (2013.01);
(Continued)

(58) Field of Classification Search
CPC .... H01M 2/348; H01M 2/345; H01M 4/5825; H01M 10/0525
(Continued)

(56) References Cited

U.S. PATENT DOCUMENTS 4,538,133 A * 8/1985 Pflanz ............... H01H 39/006
                                                         218/95
2010/0072950 A1   3/2010 Tatebayashi et al.
(Continued)

FOREIGN PATENT DOCUMENTS

DE   10 2008 010971 A1   8/2009
DE   10 2009 047 439 A1  6/2011
(Continued)

OTHER PUBLICATIONS

Vergossen, D., Machine Translation of DE 10 2011 115 550 A1, Apr. 2013 (Year: 2013).*

(Continued)

*Primary Examiner* — Sean P Cullen
(74) *Attorney, Agent, or Firm* — Oblon, McClelland, Maier & Neustadt, L.L.P.

(57) ABSTRACT

A storage battery, including: first and second stages connected electrically in series, each stage including at least first, second, and third batteries connected electrically in parallel; at least first and second breakers by which the batteries of the first stage are connected in parallel and by which the batteries of the second stage are connected in parallel, each one of the breakers including: first and second electrodes; a fuse including a conducting link connected in series between the first and second electrodes and a fusible (Continued)

portion; an explosive, with a heat bridge between the fuse and the explosive causing the conducting link to open, the explosive having an explosion initiation temperature that is lower than the melting point of the fusible portion.

8 Claims, 8 Drawing Sheets

(52) U.S. Cl.
CPC .... *H01M 10/0525* (2013.01); *H01H 85/0241* (2013.01); *H01M 2200/103* (2013.01); *H01M 2200/20* (2013.01); *H01M 2220/20* (2013.01); *Y02E 60/122* (2013.01); *Y02T 10/7011* (2013.01)

(58) Field of Classification Search
USPC .......................................................... 429/61
See application file for complete search history.

(56) References Cited

U.S. PATENT DOCUMENTS

| | | | |
|---|---|---|---|
| 2012/0119704 A1* | 5/2012 | Beranger | H01M 2/206 320/117 |
| 2016/0225558 A1* | 8/2016 | Chatroux | H01H 39/004 |

FOREIGN PATENT DOCUMENTS

| | | |
|---|---|---|
| DE | 10 2011 115 550 A1 | 4/2013 |
| JP | 8-205411 A | 8/1996 |

OTHER PUBLICATIONS

International Search Report dated Feb. 24, 2015 in PCT/FR2014/052824 filed Nov. 6, 2014.

* cited by examiner

STORAGE BATTERY INCLUDING A DISCONNECTOR HAVING A FUSE AND AN EXPLOSIVE WITH A HEAT BRIDGE PROVIDING CONTINUITY OF SERVICE IN THE EVENT OF A MALFUNCTION

The invention concerns electrochemical storage batteries. These may be used in the field of electric and hybrid transport or onboard systems, for example.

Hybrid internal combustion engine/electrical or electric vehicles notably include high-power storage batteries. Such storage batteries are used to drive an alternating current electric motor via an inverter. The voltage levels necessary for such motors reach several hundred volts, typically of the order of 400 volts. Such storage batteries also have a high capacity in order to favor the range of the vehicle in electric mode.

To obtain high powers and capacities, a number of groups of accumulators are connected in series. The number of stages (the number of groups of accumulators) and the number of accumulators in parallel (the number of arms) in each stage vary as a function of the voltage, the current and the capacity required for the storage battery. The combination of a plurality of accumulators is referred to as a storage battery or a battery of accumulators. The electrochemical accumulators used in such vehicles are generally of the lithium-ion type because of their capacity to store a large amount of energy with a moderate weight and volume. Lithium-ion iron phosphate ($LiFePO_4$) type storage battery technologies are undergoing considerable development because of a high intrinsic safety level, achieved to the detriment of a slightly lower energy storage density. An electrochemical accumulator usually has a nominal voltage of the following order of magnitude:

3.3 V for a lithium-ion iron phosphate ($LiFePO_4$) technology, 4.2 V for a cobalt oxide based lithium-ion type technology.

The invention may also apply to supercapacitors.

In a known prior art lithium-ion storage battery, a storage battery is made up of a plurality of stages connected in series. Each stage comprises a plurality of similar accumulators connected in parallel in respective arms. One or more loads are intended to be connected to the terminals of the storage battery. The total voltage between the terminals of the storage battery is the sum of the voltages of the stages. The current generated at the positive terminal of the storage battery is the sum of the currents in the various arms. A load balancing circuit is connected to the terminals of each stage of the storage battery.

Throughout the service life of the storage battery, certain faults may occur in some accumulators constituting the storage battery. A fault in one accumulator is normally reflected either in the short-circuiting of the accumulator, or an open-circuit or a high leakage current in the accumulator. It is important to know the impact on the storage battery of the failure of an accumulator. An open-circuit or a short-circuit can cause the entire storage battery to fail.

In the event of the appearance of a high leakage current in an accumulator of a stage, the storage battery behaves as a resistance that causes the accumulators of the stage concerned to be totally discharged. The fire risk is low because the energy is dissipated relatively slowly. With the lithium-ion technology, the discharging of the accumulators of the stage to a zero voltage damages them, which entails replacing them as well as the accumulator that initially failed. If an accumulator forms a short-circuit, the other accumulators of the stage will initially discharge into that accumulator because of the large cross-section of the electrical connections between them. The fuse in series with the short-circuited accumulator will interrupt the parasitic discharging of the other accumulators.

In order to protect the storage battery from the consequences of a short-circuit in an accumulator, each accumulator includes a fuse that is connected in series with it. If an accumulator forms a short-circuit, the current flowing through it increases significantly and causes its series fuse to melt in order to protect the rest of the storage battery. In the absence of any fuse, the dissipation of energy in the short-circuited accumulator would cause it to become overheated and likewise the other accumulators becoming discharged. Such dissipation could start a fire. The lithium-ion technologies are particularly at risk when a stage comprises a large number of accumulators in parallel to store a large amount of energy. Cobalt oxide is known to be a highly reactive chemical. Iron phosphate ($LiFePO_4$) is known as the safest chemical. The use of fuses therefore proves particularly appropriate for these technologies, in particular for the iron phosphate technology, which is able to withstand a certain overvoltage.

However, the presence of fuses in series between the stages of accumulators induces non-negligible losses, representing a particular handicap for onboard applications.

The document WO 2011/003924 describes a storage battery structure making it possible to eliminate the losses induced by a protection system during normal operation of the storage battery and moreover making it possible to ensure continuity of service of the storage battery if an element of the storage battery is open-circuit or short-circuited.

In the above document, the storage battery includes at least first and second arms each including at least first and second accumulators connected in series. The storage battery further includes a circuit-breaker or a fuse by means of which the first accumulators are connected in parallel and by means of which the second accumulators are connected in parallel. The tripping threshold of the circuit-breaker is chosen so that it opens if one of the accumulators is short-circuited.

If an arm includes a short-circuited accumulator, the circuit-breakers connecting it in parallel to one or more accumulators of the same stage must break the circuit. An overvoltage is then applied to a number of accumulators of that arm. For storage battery technologies such as the $LiFePO_4$ technology, such an overvoltage will not lead to the destruction of those accumulators. Thus, the end of charge voltage of an $LiFePO_4$ accumulator is 3.6 V, while its decomposition voltage is of the order of 4.5 V. An arm containing a sufficient number of accumulators in series, one of which is faulty, is therefore able to withstand this overvoltage and to guarantee continuity of service.

In practice, such a structure can have drawbacks. If the voltage of each stage is relatively low (for example of the order of 3 V), the melting of a fuse or the opening of a circuit-breaker is relatively difficult to control. The circuit-breakers connecting the faulty accumulator may then prove defective. Other circuit-breakers connecting other accumulators of the faulty arm also pose a problem: the short-circuiting of the faulty accumulator further induces a lower potential difference (for example of the order of 1 V) at the terminals of those circuit-breakers. The opening thereof is therefore even more problematic.

When fuses are used, operation can be even more problematic. In fact, the resistivity of a fuse may increase with temperature. The fuse may then have a temperature that stabilizes below the melting point, because of a lower current output by the voltage sources.

At low voltage levels it is therefore possible to encounter configurations in which the circuit-breakers do not open or open too slowly. A number of accumulators in series with the faulty accumulator may then be subjected to an excessive overvoltage, leading to their destruction.

A load balancing management circuit is connected to the terminals of each of the stages of the storage battery. The load balancing circuit is configured to charge the batteries of these stages so as to optimize the effective capacity of the storage battery. In practice, the protection of the load balancing management circuit against failure of an accumulator is imperfect.

The invention aims to remove one or more of the above drawbacks. The invention therefore concerns a storage battery, including at least:
  first and second stages electrically connected in series, each stage including at least first, second and third accumulators electrically connected in parallel;
  at least first and second disconnectors by means of which the first, second and third accumulators of said first stage are connected in parallel and by means of which the first, second and third accumulators of said second stage are connected in parallel, each of said disconnectors including:
    first and second electrodes;
    a fuse including a conducting link connected in series between the first and second electrodes and including a fusible portion;
    an explosive, a heat bridge being formed between the fuse and the explosive so that the heating of said fuse forms a detonator initiating the explosion of the explosive, the explosion of the explosive causing said conducting link to open, the explosive having an explosion initiation temperature that is lower than the melting point of said fusible portion.

In accordance with one variant, said accumulators are electrochemical accumulators withstanding without being destroyed a potential difference between their terminals at least 10% greater than their nominal voltage.

In accordance with another variant, said accumulators are of lithium-ion (LiFeP) type.

In accordance with another variant, the storage battery includes a device for detecting the opening of a conducting link, and each of said disconnectors includes a conducting element connected in series between two terminals of the detection device, the conducting element being disposed so as to be broken by the explosion of the explosive of its disconnector.

In accordance with a further variant, the first electrode of the first and second disconnectors is connected to a common connection node, the second electrode of the first disconnector is connected to the first accumulator of the first stage, and the second electrode of the second disconnector is connected to the second accumulator of the first stage.

In accordance with a variant, said first accumulators are connected in series in a first arm, the second accumulators are connected in series in a second arm, said third accumulators are connected in series in a third arm, the storage battery further including first, second and third protection circuits connected in series in the first, second and third arms, respectively, each of said protection circuits including a fuse through which the series current of the arm passes, respective heat bridges being formed between:
  the explosive of the first disconnector and the fuse of the fourth protection circuit;
  the explosive of the second disconnector and the fuse of the fifth protection circuit.

In accordance with a further variant, the storage battery further includes:
  a third stage electrically connected in series with the first and second stages, the third stage including at least first, second and third accumulators electrically connected in parallel;
  at least fifth and sixth disconnectors by means of which the first, second and third accumulators of said second stage are connected in parallel and by means of which the first, second and third accumulators of said third stage are connected in parallel, the fifth and sixth disconnectors including:
    first and second electrodes;
    a fuse including a conducting link connected in series between the first and second electrodes and including a fusible portion;
    an explosive, a heat bridge being formed between the fuse and the explosive so that the heating of said fuse forms a detonator initiating the explosion of the explosive, the explosion of the explosive causing said conducting link to open, the explosive having an explosion initiation temperature that is lower than the melting point of said fusible portion;
wherein the explosive of the first disconnector and the explosive of the fifth disconnector are included in the same first continuous explosive element, and wherein the explosive of the second disconnector and the explosive of the sixth disconnector are included in the same second continuous explosive element.

In accordance with another variant, said first accumulators are connected in series in a first arm, in which the second accumulators are connected in series in a second arm, said third accumulators are connected in series in a third arm, fourth, fifth and sixth protection circuits being connected in series in the first, second and third arms, respectively, each of said protection circuits including first and second fuses connected in parallel, respective heat bridges being formed between:
  said first continuous explosive element and the second fuse of the fourth protection circuit;
  said first continuous explosive element and the first fuse of the fifth protection circuit;
  said second continuous explosive element and the second fuse of the fifth protection circuit;
  said second continuous explosive element and the first fuse of the sixth protection circuit.

Other features and advantages of the invention will emerge clearly from the following description given by way of nonlimiting illustration and with reference to the appended drawings, in which.

Figure 1:
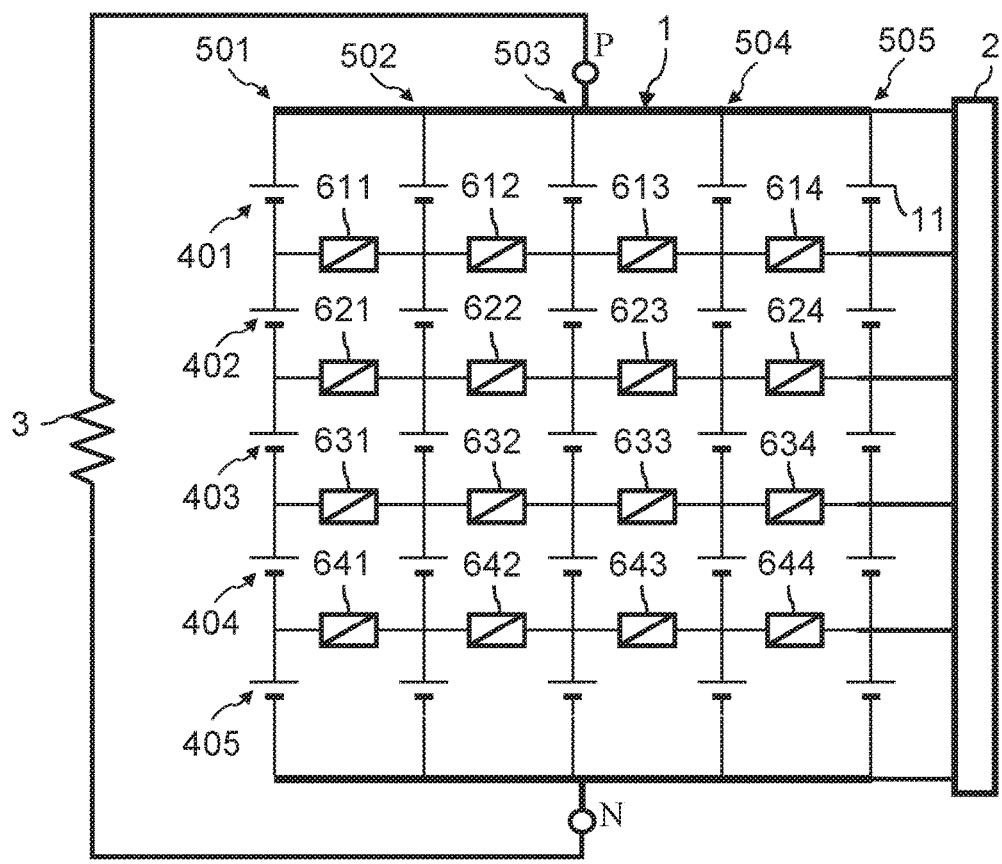
FIG. 1 is a diagrammatic representation of a storage battery example in accordance with one embodiment of the invention.

FIG. 1 is a diagrammatic representation of an example of a storage battery 1 in accordance with one embodiment of the invention. The storage battery 1 comprises five stages 401 to 405 electrically connected in series. Each stage comprises five accumulators or electrochemical cells 11 electrically connected in parallel. The storage battery 1 therefore comprises five arms 501 to 505 electrically connected in parallel. The accumulators 11 of a stage are connected in parallel via disconnectors. Each disconnector participates in the parallel connection of two accumulators 11 of a stage as well as the parallel connection of two accumulators 11 of another stage. The disconnectors 611 to 614 therefore participate in the parallel connection of the accumulators of the stage 401 and the parallel connection of the accumulators of the stage 402. In a similar way, the disconnectors 621 to 624 participate in the parallel connection of the accumulators of the stage 402 and the parallel connection of the accumulators of the stage 403. In a similar way, the disconnectors 631 to 634 participate in the parallel connection of the accumulators of the stage 403 and the parallel connection of the accumulators of the stage 404. In a similar way, the disconnectors 641 to 644 participate in the parallel connection of the accumulators of the stage 404 and the parallel connection of the accumulators of the stage 405.

An electrical load 3 is connected to the terminals P and N of the storage battery 1 so as to be supplied with power by that storage battery. A load balancing management circuit 2 is electrically connected to each of the stages 401 to 405. The circuit 2 is configured to charge the accumulators 11 of those stages. The circuit 2 is also configured to monitor the state of charge of the accumulators. The circuit 2 is also configured to balance the load of the accumulators of these stages, as a function of monitoring their state of charge. The charging/state of charge monitoring/load balancing functions are known per se and will not be described in more detail. At the level of the terminals P and N, the storage battery 1 advantageously includes power collectors through which the parallel currents coming from the various arms 501 to 505 pass.

Moreover, the circuit 2 of this example may advantageously be used to determine the conducting state of the various disconnectors, in order to determine the location of any malfunction within the storage battery 1.

The disconnectors make it possible to restrict the current fed through a short-circuited accumulator 11 in order to prevent any risk of overheating and of starting a fire, even in the presence of a large number of accumulators connected in parallel in each stage. The discharge power of the accumulators 11 of a stage including a short-circuited accumulator is also limited, which can make it possible to continue using the storage battery 1.

During a charging or discharging phase, the principal current in an arm passes through all of the accumulators connected in series in that arm. During such operation, if all the accumulators are similar and have the same state of charge or discharge, no cross-current flows through the disconnectors.

Each of the disconnectors comprises:
first and second electrodes;
a fuse including a conducting link connected in series between the first and second electrodes and including a fusible portion;
an explosive. A heat bridge is formed between the fuse and the explosive so that the heating of this fuse forms a detonator initiating the explosion of the explosive, the explosion of the explosive causing the opening of the conducting link of the fuse. The explosive has an explosion initiation temperature lower than the melting point of the fusible portion of the explosive.

Accordingly, in the event that a malfunction of an accumulator 11 induces a current through a disconnector that is insufficient to melt the fusible portion of its fuse, that current can cause sufficient heating of the fuse to cause the explosion of the explosive and therefore the opening of the conducting link of the fuse. Disconnection is therefore obtained even when the voltage at the terminals of the disconnector is low. The fuse remains useful for breaking the circuit in the event of a sudden increase in the current.

A copper conducting link of a fuse typically has a melting point of the order of 1000° C. Known explosives have an explosion initiation temperature of the order of 300° C.

Figure 2:
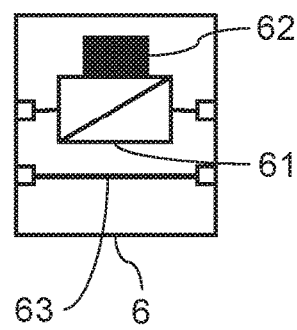
FIG. 2 is a diagrammatic representation of a disconnector in accordance with a first variant.

FIG. 2 is a diagrammatic representation of a first variant of a disconnector 6 that can be used in the context of the invention. The disconnector 6 includes first and second electrodes between which a conducting link of a fuse 61 is connected in series. The disconnector 6 further includes an explosive 62, with a heat bridge formed between the fuse 61 and the explosive 62. Here the explosive 62 is pressed against the fuse 61.

In the FIG. 2 variant, the disconnector 6 further includes a conducting element 63 the function of which will be explained in detail in an example of use. The conducting element 63 is disposed so that it is broken by the explosion of the explosive 62. In the variant shown in FIG. 3, the disconnector 6 has the same features as the disconnector from FIG. 2 and further includes a conducting element 64 the function of which will be explained in detail in another example of use. The conducting element 64 is disposed so that it is broken by the explosion of the explosive 62.

Figure 4:
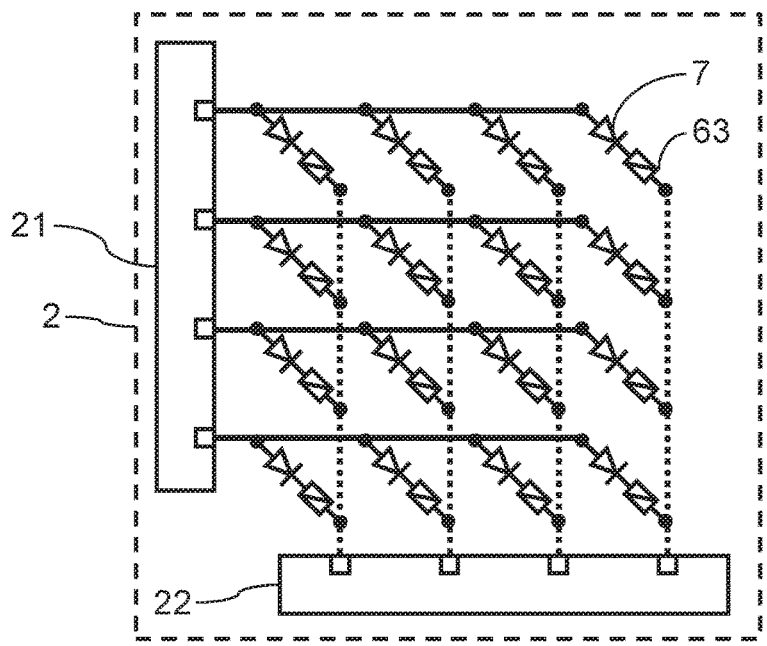
FIG. 4 is an electrical circuit diagram of a first example of the connection of the disconnectors to a control circuit.

FIG. 4 is an electrical circuit diagram of a first example of the connection of disconnectors 6 to a circuit 2 for monitoring their open state, using disconnectors 6 as highlighted in FIG. 2. The control circuit 2 includes an emitter 21 intended to emit a control signal. The emitter 21 is connected to a plurality of rows. The emitter 21 sequentially emits a signal on each of these rows. The control circuit 2 further includes a receiver 22. The receiver 22 is connected to a plurality of columns. Between each row and each column, a conducting element 63 of a disconnector 6 and a diode 7 are connected in series. Each conducting element 63 is therefore connected between a terminal of the emitter 21 and a terminal of the receiver 22 of the control circuit 2. If a disconnector 6 is open, the signal emitted by the emitter 21 on its row is not transmitted on its column to the receiver 22. The control circuit 2 is therefore able to determine exactly which disconnector is open.

A storage battery 1 in accordance with the invention advantageously includes lithium-ion LiFePO$_4$ type accumulators with a number of stages greater than or equal to 5. In fact, an accumulator of this type withstands an overvoltage relative to its nominal voltage (voltage up to 4.2 V) and the overvoltage induced in the accumulators of an arm including a short-circuited accumulator does not lead to their destruction or to a safety risk for such a large number of stages. Generally speaking, the storage battery 1 will preferably include electrochemical accumulators 11 withstanding without being destroyed a potential difference between their terminals at least 10% greater than their nominal voltage.

Figure 3:
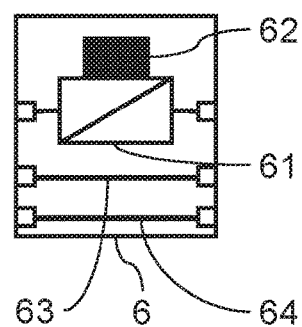
FIG. 3 is a diagrammatic representation of a disconnector in accordance with a second variant.
Figure 5:
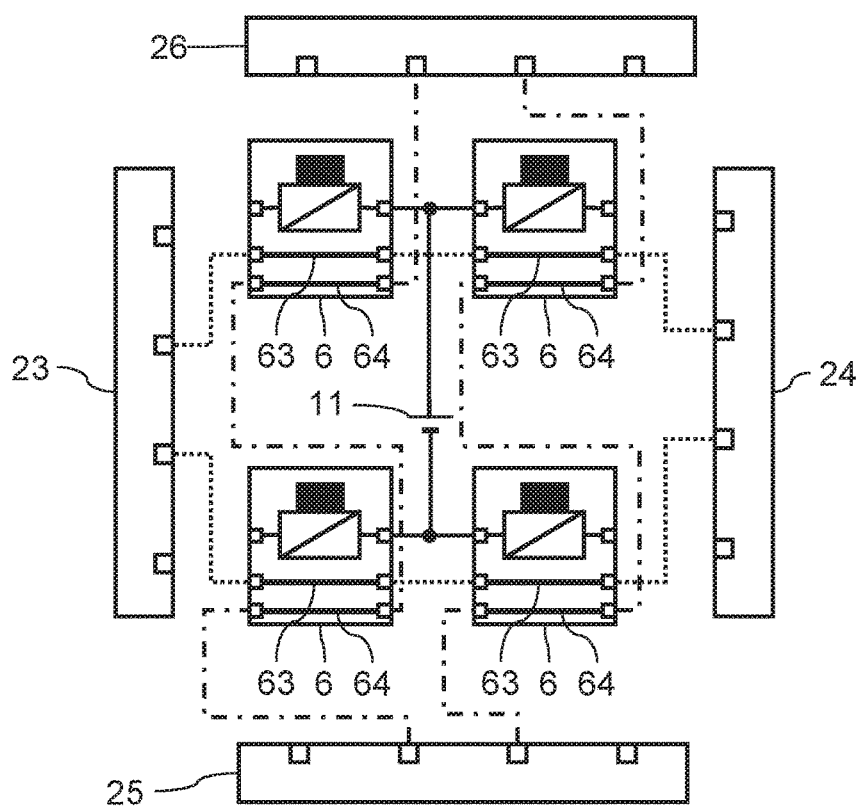
FIG. 5 is an electrical circuit diagram of a second example of the connection of the disconnectors to a control circuit.

FIG. 5 is an electrical circuit diagram of a second example of the connection of disconnectors 6 to a circuit 2 for monitoring their open state, using disconnectors 6 as highlighted in FIG. 3. The monitoring circuit 2 includes an emitter 23 intended to emit a control signal. The emitter 23 is connected to a plurality of rows. The emitter 23 emits a signal on each of those rows. The monitoring circuit 2 further includes a receiver 24 intended to receive the control signal from the various rows. Each row corresponds to a row of disconnectors 6 the conducting elements 63 of which are connected in series.

The monitoring circuit 2 includes an emitter 25 intended to emit a control signal. The emitter 25 is connected to a plurality of columns. The emitter 25 emits a signal on each of these columns. The monitoring circuit 2 further includes a receiver 26 intended to receive the control signal from the various columns. Each column corresponds to a column of disconnectors 6 the conducting elements 64 of which are connected in series.

Accordingly, by determining that the receivers 24 and 26 are not receiving control signals for a row and a column, respectively, the monitoring circuit 2 is able to determine which disconnector 6 is open.

Figure 6:
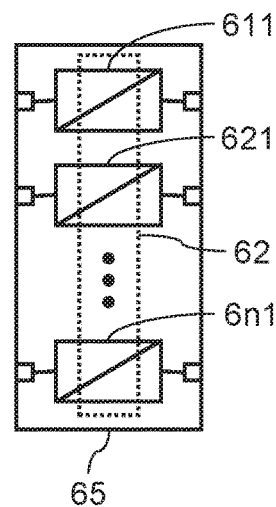
FIG. 6 is a diagrammatic representation of a first module example including a plurality of disconnectors.

FIG. 6 is a diagrammatic representation of a first example of a module 65 including a plurality of disconnectors. Such a module 65 is intended to cause the opening of a set of disconnectors in the event of one of them opening in order to be able to isolate all of the accumulators 11 of one arm from the other arms. The module 65 from FIG. 6 therefore comprises disconnectors 611 to 6$n$1 intended to connect in parallel the various stages of two arms. A continuous explosive element 62 is in thermal contact with each of the fuses of the disconnectors 611 to 6$n$1. It is therefore sufficient for only one of the fuses of the disconnectors 611 to 6$n$1 to be opened by an explosion for all of the fuses of these disconnectors to be opened by the explosion of the continuous explosive element 62.

Figure 7:
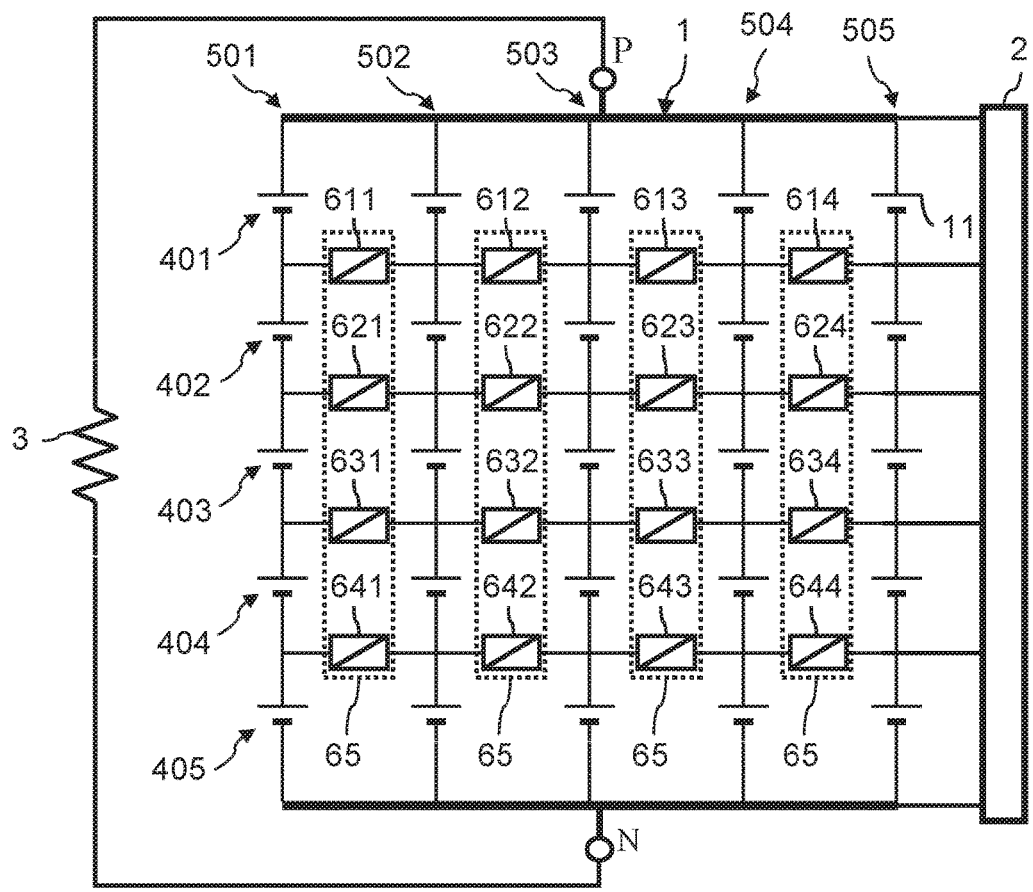
FIG. 7 is a diagrammatic representation of another storage battery example using the module from FIG. 6.

FIG. 7 is an electrical circuit diagram of an example of a storage battery 1 using modules 65 as highlighted in FIG. 6 to isolate one arm from the others. The parallel connections between the arms 501 and 502 are effected via disconnectors 611 to 641 of a module 65 with a continuous explosive element 62. The parallel connections between the arms 502 and 503 are effected via disconnectors 612 to 642 of a module 65 with a continuous explosive element 62. The parallel connections between the arms 503 and 504 are effected via disconnectors 613 to 643 of a module 65 with a continuous explosive element 62. The parallel connections between the arms 504 and 505 are effected via disconnectors 614 to 644 of a module 65 with a continuous explosive element 62.

Figure 8:
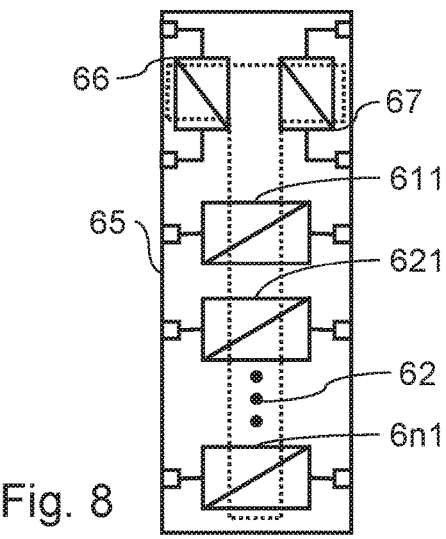
FIG. 8 is a diagrammatic representation of a second module example including a plurality of disconnectors.

FIG. 8 is a diagrammatic representation of a second example of a module including a plurality of disconnectors. Such a module 65 is intended to cause the opening of a set of disconnectors in the event of opening of one of them in order to be able to isolate all of the accumulators 11 of one arm from the other arms and to be able to interrupt the series current in that arm. The module 65 from FIG. 8 comprises on the one hand disconnectors 611 to 6$n$1 intended to connect in parallel the various stages of two arms. A continuous explosive element 62 is in thermal contact with each of the fuses of the disconnectors 611 to 6$n$1. The module 65 further comprises disconnectors 66 and 67 intended to be connected in series in a respective arm.

Figure 9:
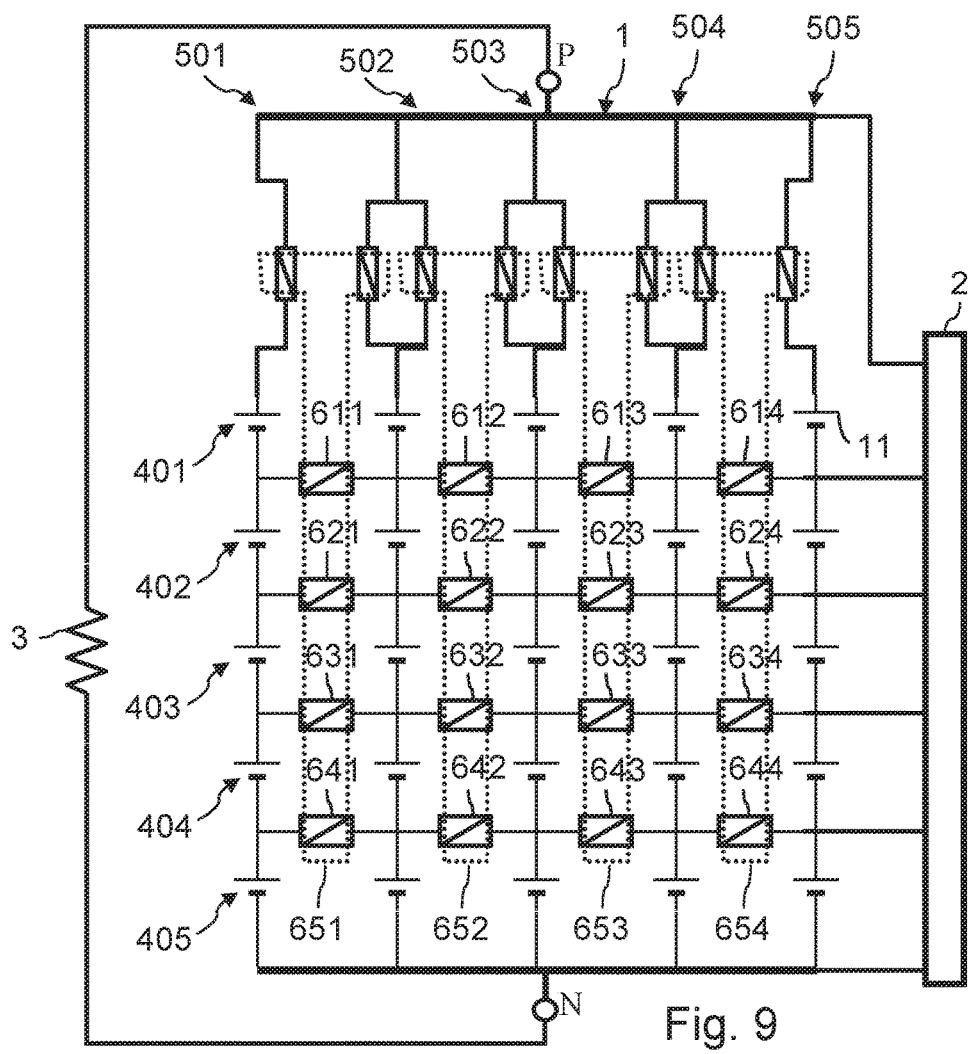
FIG. 9 is a diagrammatic representation of another storage battery example using the module from FIG. 8.

FIG. 9 is an electrical circuit diagram of an example of a storage battery 1 using modules 65 as highlighted in FIG. 8. The parallel connections between the arms 501 and 502 are effected via disconnectors 611 to 641 of a module 651 with a continuous explosive element 62. The parallel connections between the arms 502 and 503 are effected via disconnectors 612 to 642 of a module 652 with a continuous explosive element 62. The parallel connections between the arms 503 and 504 are effected via disconnectors 613 to 643 of a module 653 with a continuous explosive element 62. The parallel connections between the arms 504 and 505 are effected via disconnectors 614 to 644 of a module 654 with a continuous explosive element 62.

Moreover, a disconnector 66 of the module 651 is connected in series in the arm 501. A disconnector 67 of the module 651 and a disconnector 66 of the module 652 are connected in parallel to form a protection circuit of the arm 502. This protection circuit is connected in series with the accumulators 11 of the arm 502. A disconnector 67 of the module 652 and a disconnector 66 of the module 653 are connected in parallel to form a protection circuit of the arm 503. This protection circuit is connected in series with the accumulators 11 of the arm 502. A disconnector 67 of the module 653 and a disconnector 66 of the module 654 are connected in parallel to form a protection circuit of the arm 504. This protection circuit is connected in series with the accumulators 11 of the arm 504. A disconnector 67 of the module 654 is connected in series in the arm 505.

If an excessive current flows through the arm 502, for example, the disconnector 67 of the module 651 and the disconnector 66 of the module 652 initiate the explosion of their respective explosive elements. All of the disconnectors of the modules 651 and 652 are then open. No series current can then flow in the arm 502. No parallel current can flow with the arms 501 and 503 either.

If an excessive parallel current flows through a disconnector of the module 651, that disconnector initiates the explosion of the explosive element of its module. All of the disconnectors of its module are then open. If the cause of the parallel current is a malfunction in the arm 502, an excessive parallel current also appears through a disconnector of the module 652. That disconnector initiates the explosion of the explosive element of its module. All of the disconnectors of its module are then open. No series current can then flow in the arm 502. No parallel current can flow in the arms 501 and 503 either. The accumulators of the arm 501 are not subjected to overvoltages imposed by connections with the accumulators of the other arms. The invention is thus able to protect lithium accumulators the electrochemistry of which cannot withstand overvoltages like cobalt oxide, nickel cobalt aluminum (NCA), nickel manganese cobalt (NMC) and manganese oxide, for example.

Figure 10:
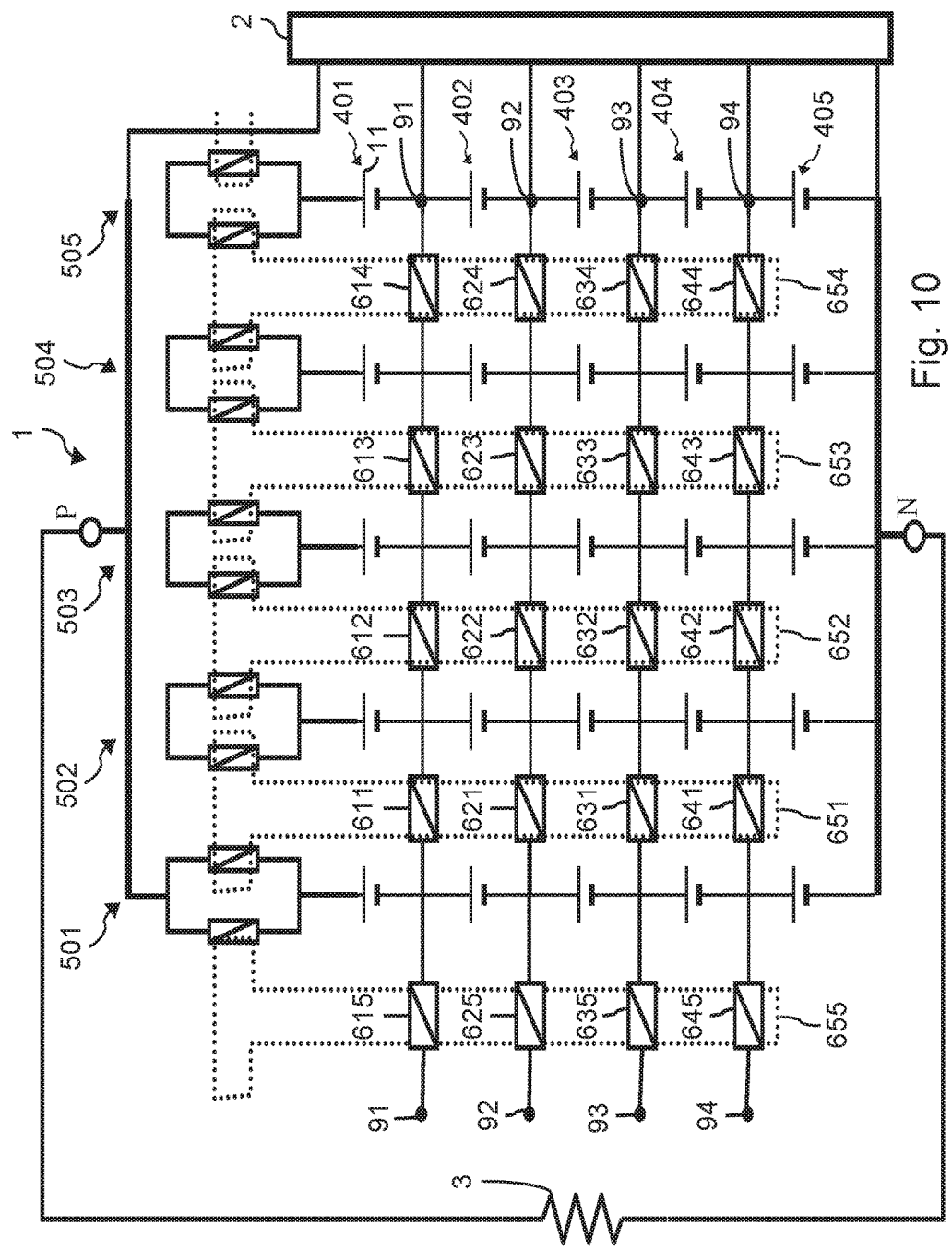
FIG. 10 is a diagrammatic representation of a variant of the storage battery from FIG. 9.

FIG. 10 is an electrical circuit diagram of an example of a storage battery 1 in accordance with a variant of FIG. 9.

This variant differs in the presence of a module 655 with a continuous explosive element 62 as highlighted in FIG. 8. Parallel connections are formed between the arms 501 and 505 via the disconnectors 615, 625, 635 and 645 of the module 655. The nodes 91 to 94 illustrate the connections of the disconnectors 615, 625, 635 and 645 to the arm 505.

Moreover, the disconnector 67 of the module 655 and the disconnector 66 of the module 651 are connected in parallel to form a protection circuit of the arm 501. The disconnector 66 of the module 655 and the disconnector 67 of the module 654 are connected in parallel to form a protection circuit of the arm 505.

Figure 11:
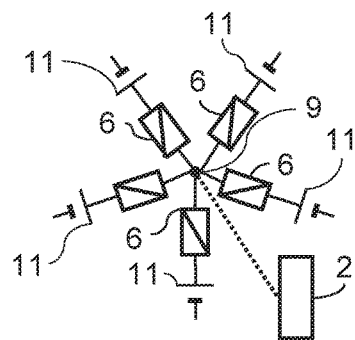
FIG. 11 is a diagrammatic representation of a third example of the connection of the disconnectors to a control circuit.

FIG. 11 represents diagrammatically an advantageous variant of the connection of accumulators 11 in a stage by means of disconnectors 6. Here, all of the accumulators 11 of the stage have a terminal connected to a common connection node 9 by means of respective disconnectors 6. The other terminal of these accumulators 11 may be connected to another common connection node 9 by means of respective other disconnectors 6.

Figure 12:
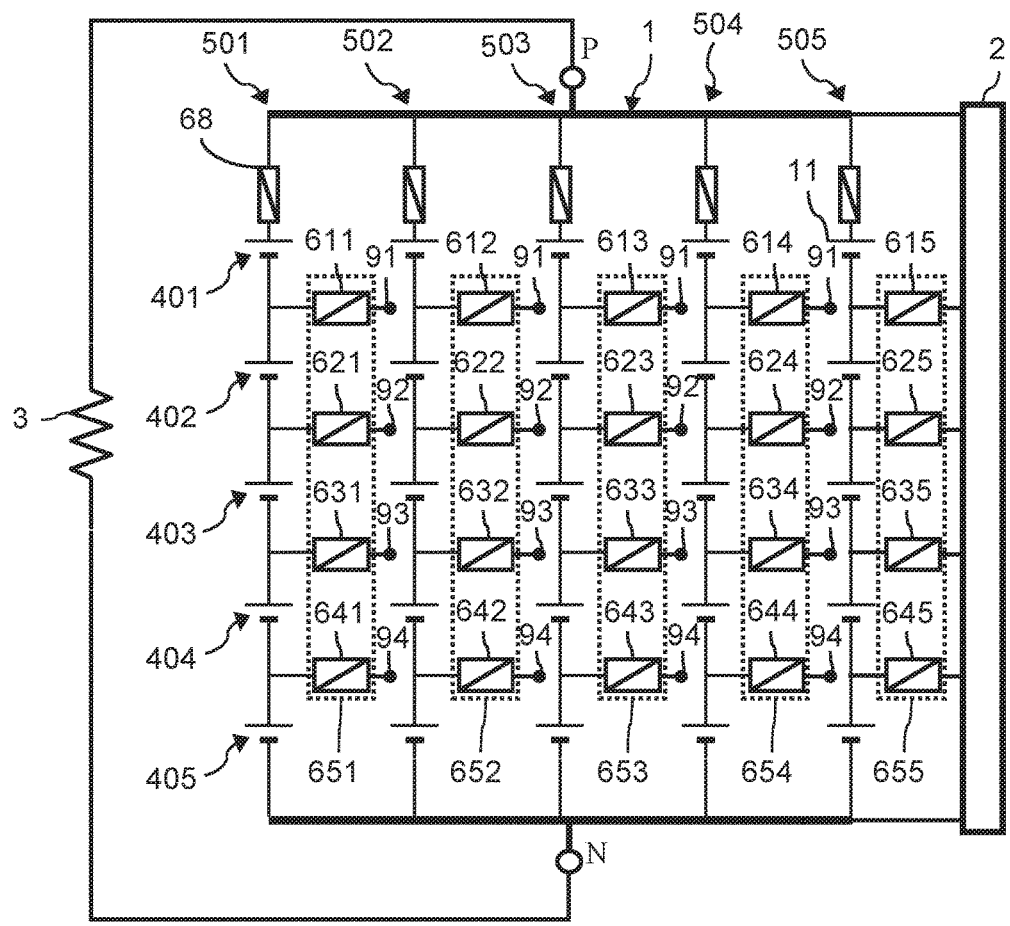
FIG. 12 is a diagrammatic representation of the connection from FIG. 11 using the module from FIG. 6.

FIG. 12 is an electrical circuit diagram of an example of a storage battery 1 using connections of accumulators with disconnectors as shown in FIG. 11. Each of the disconnectors 611, 612, 613, 614 and 615 has a terminal connected to a common connection node 91. The common connection node 91 is connected to the circuit 2. The accumulators of the stage 401 are connected in parallel via the disconnectors 611, 612, 613, 614 and 615. The accumulators of the stage 402 are connected in parallel via the disconnectors 611, 612, 613, 614 and 615. Each of the disconnectors 621, 622, 623, 624 and 625 has a terminal connected to a common connection node 92. The common connection node 92 is connected to the circuit 2. The accumulators of the stage 402 are connected in parallel via the disconnectors 621, 622, 623, 624 and 625. The accumulators of the stage 403 are connected in parallel via the disconnectors 621, 622, 623, 624 and 625. Each of the disconnectors 631, 632, 633, 634 and 635 has a terminal connected to a common connection node 93. The common connection node 93 is connected to the circuit 2. The accumulators of the stage 403 are connected in parallel via the disconnectors 631, 632, 633, 634 and 635. The accumulators of the stage 404 are connected in parallel via the disconnectors 631, 632, 633, 634 and 635. Each of the disconnectors 641, 642, 643, 644 and 645 has a terminal connected to a common connection node 94. The common connection node 94 is connected to the circuit 2. The accumulators of the stage 404 are connected in parallel via the disconnectors 641, 642, 643, 644 and 645. The accumulators of the stage 405 are connected in parallel via the disconnector 641, 642, 643, 644 and 645. The disconnectors 611, 621, 631 and 641 are included in a same module 651 having an explosive element extending continuously between these disconnectors. The disconnectors 612, 622, 632 and 642 are included in a same module 652 including an explosive element extending continuously between these disconnectors. The disconnectors 613, 623, 633 and 643 are included in a same module 653 including an explosive element extending continuously between these disconnectors. The disconnectors 614, 624, 634 and 644 are included in the same module 654 including an explosive element extending continuously between these disconnectors. The disconnectors 615, 625, 635 and 645 are included in the same module 655 including an explosive element extending continuously between these disconnectors. Each arm 501, 502, 503, 504 and 505 moreover includes a fuse 68 connected in series with its accumulators 11. The modules 651, 652, 653, 654 and 655 are associated with the arms 501, 502, 503, 504 and 505, respectively.

In such a structure, it remains possible to balance the load of arms where there is no fault even in the presence of an arm in which there is a fault. In such a structure, the balancing currents pass only through the disconnector associated with the battery concerned. There is therefore no disconnector carrying charging or balancing current going to a plurality of accumulators 11, which limits the losses. Here the circuit 2 is connected to the common connection nodes 9 in order to be able to balance the load of the various accumulators 11.

Figure 13:
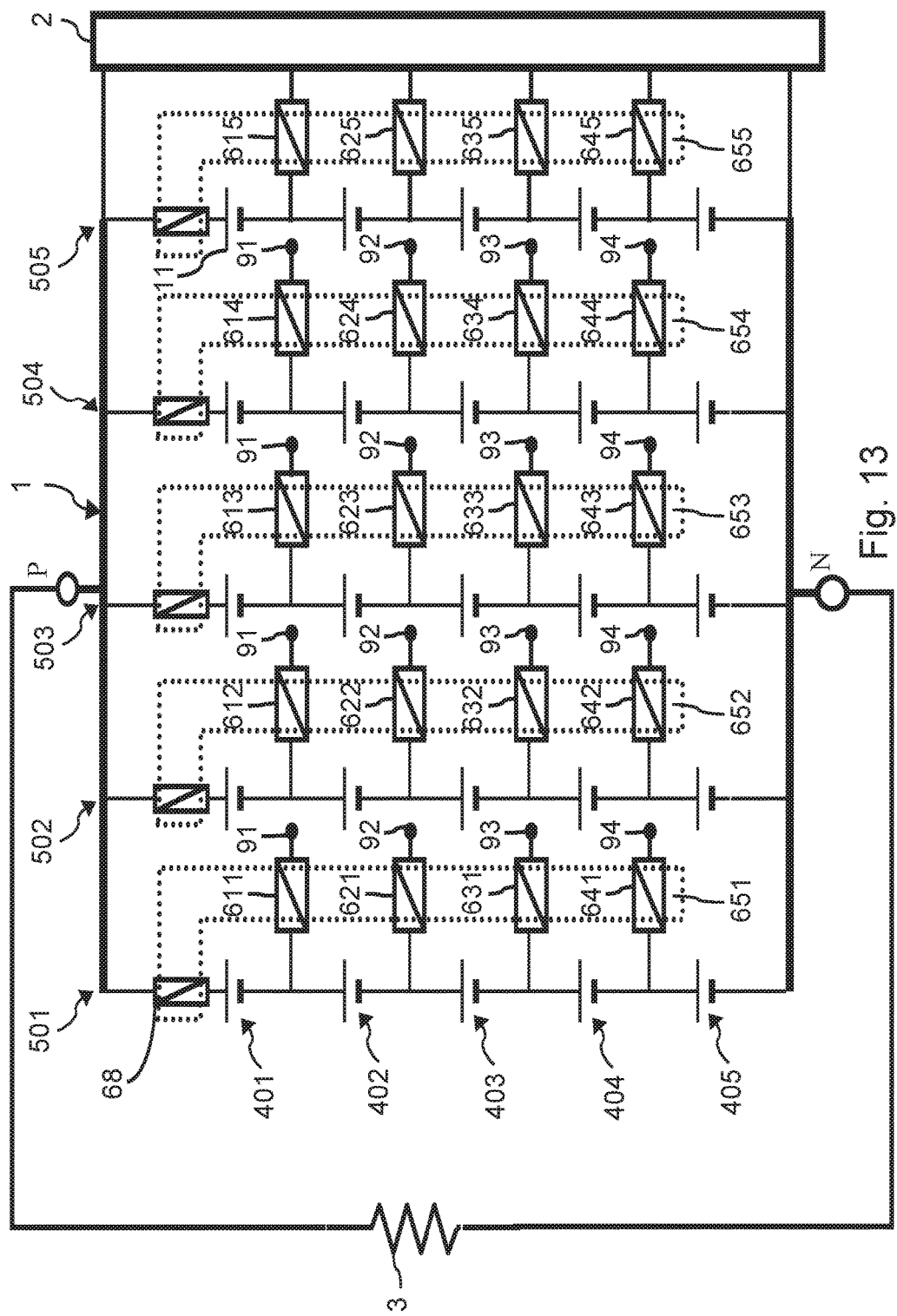
FIG. 13 is a diagrammatic representation of another storage battery example.

FIG. 13 is an electrical circuit diagram of a variant of the storage battery 1 shown in FIG. 12. In this variant, the explosive element of each of the modules 651, 652, 653, 654 and 655 comes into thermal contact with the fuse 68 of its arm. On triggering of an explosive element by one of the disconnectors of the arm or by the fuse 68 of the arm, that fuse 68 and those disconnectors are therefore open. No serial current can then flow in this arm. No parallel current can flow in the other arms either. Such a structure is therefore particularly suitable if the accumulators 11 are not designed to withstand a potential difference between their terminals greater than their nominal voltage.

Another structure may employ modules including a continuous explosive element including a heat bridge with a plurality of disconnectors. For example, a zener diode may be connected to the terminals of one or more accumulators of an arm. The zener diode includes a heat bridge with the explosive element. If the voltage at the terminals of the zener diode is abnormally high, that zener diode heats up. This heating up can then initiate the explosion of the explosive element and therefore the opening of the disconnectors with which it has a heat bridge. Types of peak-limiting diode other than a zener diode may be used for this same function. Such a peak-limiting diode may also be used to cause the opening of a series fuse of the arm. In order to limit the leakage currents, a zener diode may be connected to the terminals of a plurality of accumulators 11 connected in series in a arm. This variant provides safe protection against the accidental overcharging of the accumulators in the event of failure of the load management electronics. If the zener diode does not heat up sufficiently, an electrical component may be placed in series with the zener diode forming a heat bridge between that component and the continuous explosive element. This electrical component is then sized to be heated sufficiently by the zener current and then to trigger the continuous explosive element.

Figure 14:
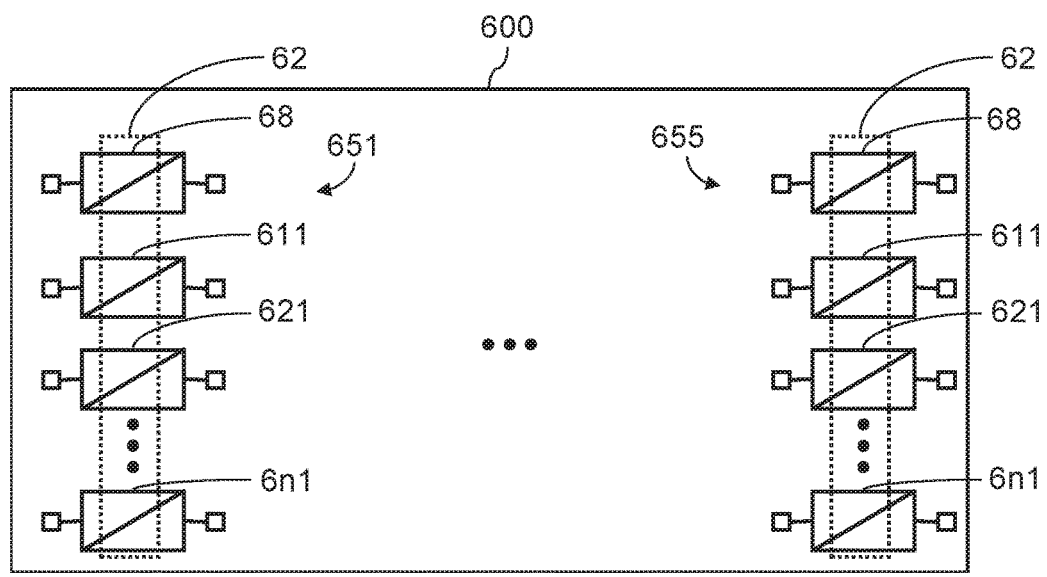
FIG. 14 is a diagrammatic representation of an integrated circuit including the disconnectors from FIG. 13.

All of the fuses of the disconnectors described in detail above may advantageously be grouped in the same integrated circuit. FIG. 14 shows an integrated circuit 600. This integrated circuit 600 includes the modules 651 to 655 from FIG. 13. The various disconnectors of these modules include connecting pads via which they are connected into the storage battery 1.

The invention claimed is:

1. A storage battery, comprising:
 first and second stages electrically connected in series, each stage including at least first, second, and third accumulator electrically connected in parallel;
 at least first and second disconnectors by which the first, second, and third accumulators of the first stage are connected in parallel and by which the first, second, and third accumulators of the second stage are connected in parallel, each of the disconnectors including a first electrode and a second electrode, wherein each of the first and second disconnectors includes:
a fuse including a conducting link connected in series between the first and second electrodes and including a fusible portion, and
an explosive, with a heat bridge between the fuse and the explosive so that heating of the fuse forms a detonator initiating the explosion of the explosive, the explosion of the explosive causing the conducting link to open, the explosive having an explosion initiation temperature that is lower than the melting point of the fusible portion,
wherein the explosion of the explosive of one of the first and second disconnectors does not affect the status of the conducting link of the other one of the first and second disconnectors.

2. The storage battery as claimed in claim 1, further comprising a detection circuit including two terminals, and wherein each of the disconnectors includes a conducting element connected in series between the two terminals of the detection circuit, the conducting element being disposed to be broken by the explosion of the explosive of its disconnector to detect opening of the conducting link.

3. The storage battery as claimed in claim 1, wherein the accumulators are electrochemical accumulators withstanding without being destroyed at a potential difference between terminals of the accumulators at least 10% greater than a nominal voltage between the terminals of the accumulators.

4. The storage battery as claimed in claim 3, wherein the accumulators are of lithium-ion $LiFePO_4$ type.

5. The storage battery as claimed in claim 1, wherein the second electrode of the first disconnector and the first electrode of the second disconnector are connected to a common connection node, wherein the first electrode of the first disconnector is connected to the first accumulator of the first stage, and wherein the second electrode of the second disconnector is connected to the third accumulator of the first stage.

6. The storage battery as claimed in claim 5, wherein the first accumulators are connected in series in a first arm, wherein the second accumulators are connected in series in a second arm, wherein the third accumulators are connected in series in a third arm;
the storage battery further comprising first, second, and third protection circuits connected in series in the first, second, and third arms, respectively, each of the protection circuits including a fuse through which a series current of the arm passes, respective heat bridges being formed between:
the explosive of the first disconnector and a fuse of fourth protection circuit;
the explosive of the second disconnector and a fuse of a fifth protection circuit.

7. The storage battery as claimed in claim 1, further comprising:
a third stage electrically connected in series with the first and second stages, the third stage including first, second, and third accumulators electrically connected in parallel; and
at least third and fourth disconnectors by which the first, second, and third accumulators of the second stage are connected in parallel and by which the first, second, and third accumulators of the third stage are connected in parallel,
the third and fourth disconnectors including:
first and second electrodes,
a fuse including a conducting link connected in series between the first and second electrodes and including a fusible portion, and
an explosive, a heat bridge being formed between the fuse and the respective explosive of the third and fourth disconnectors so that heating of the fuse forms a detonator initiating the explosion of the explosive, the explosion of the explosive causing the conducting link of the fuse of the third and fourth disconnectors to open, the explosive having an explosion initiation temperature that is lower than the melting point of the fusible portion, wherein
the explosive of the first disconnector and the explosive of the third disconnector are included in a first continuous explosive element, and wherein the explosive of the second disconnector and the explosive of the fourth disconnector are included in a second continuous explosive element.

8. The storage battery as claimed in claim 7, wherein the first accumulators are connected in series in a first arm, wherein the second accumulators are connected in series in a second arm, wherein the third accumulators are connected in series in a third arm, fourth, fifth, and sixth protection circuits being connected in series in the first, second, and third arms, respectively, each of the protection circuits including first and second fuses connected in parallel, respective heat bridges being formed between:
the first continuous explosive element and the second fuse of the fourth protection circuit;
the first continuous explosive element and the first fuse of the fifth protection circuit;
the second continuous explosive element and the second fuse of the fifth protection circuit;
the second continuous explosive element and the first fuse of the sixth protection circuit.

* * * * *